Dec. 2, 1924.

O. G. SIMMONS 1,517,921

METHOD AND APPARATUS FOR MAKING HOBS

Filed April 26, 1921     3 Sheets-Sheet 1

INVENTOR
Oliver G. Simmons
BY Cornelius D. Ehret
his ATTORNEY

Dec. 2, 1924.

O. G. SIMMONS 1,517,921

METHOD AND APPARATUS FOR MAKING HOBS

Filed April 26, 1921   3 Sheets-Sheet 2

INVENTOR
Oliver G. Simmons
BY Cornelius D. Ehret
his ATTORNEY

Dec. 2, 1924.
O. G. SIMMONS
METHOD AND APPARATUS FOR MAKING HOBS
Filed April 26, 1921      3 Sheets-Sheet 3
1,517,921
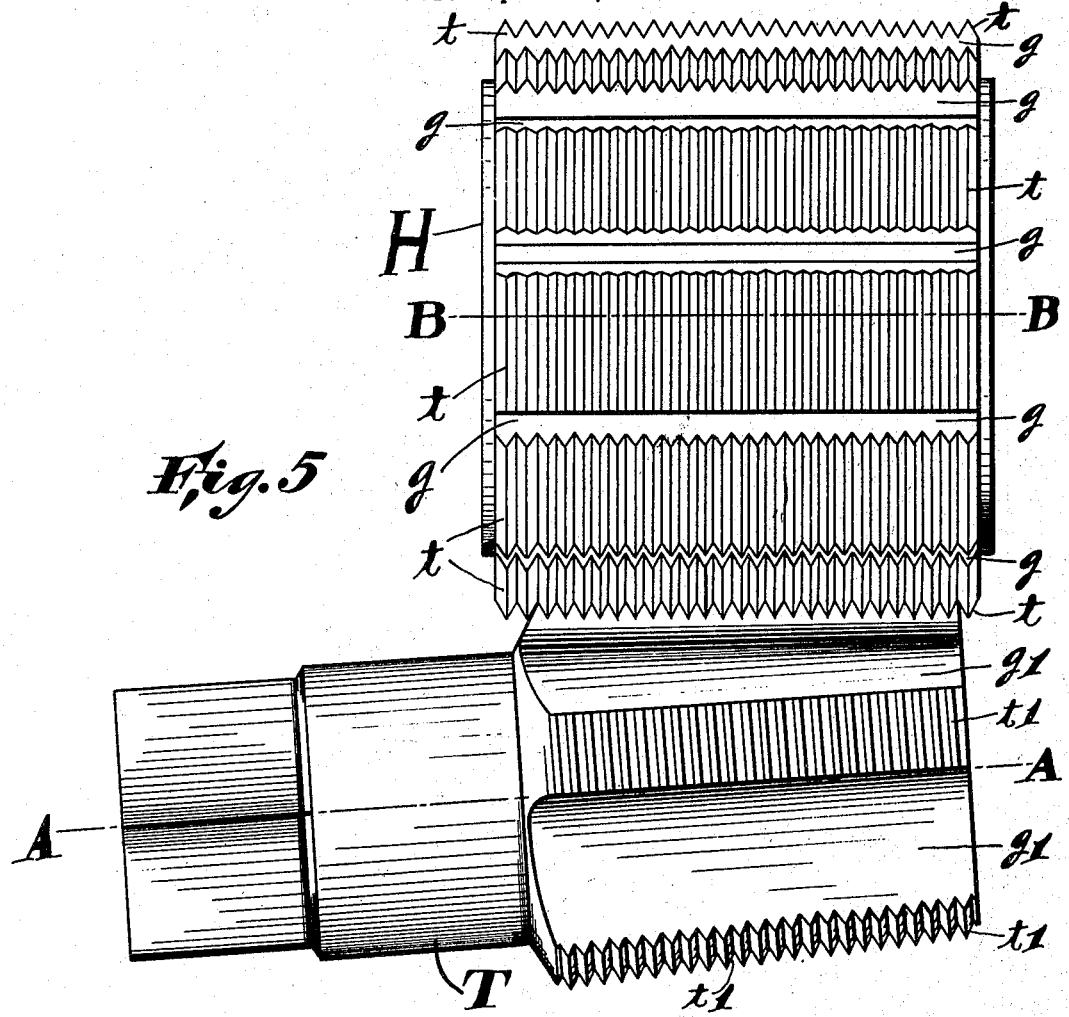
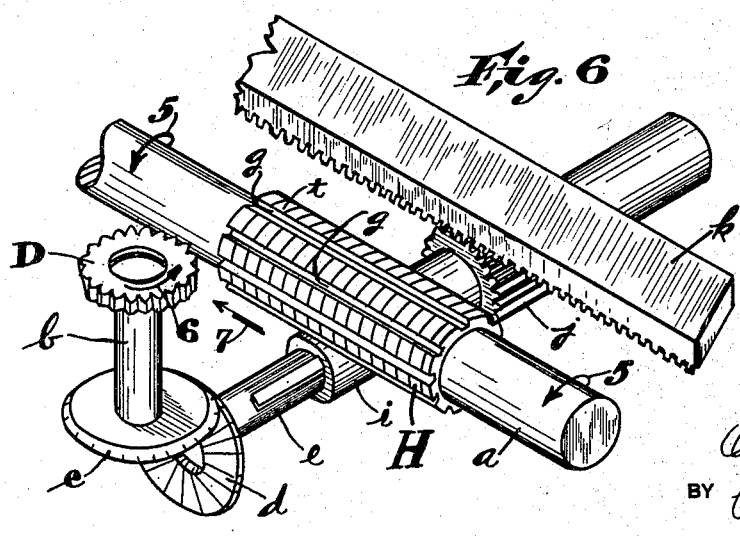
INVENTOR
Oliver G. Simmons
BY Cornelius D. Ehret
his ATTORNEY Patented Dec. 2, 1924.

1,517,921

UNITED STATES PATENT OFFICE.

OLIVER G. SIMMONS, OF PHILADELPHIA, PENNSYLVANIA, ASSIGNOR TO SIMMONS METHOD-HOB COMPANY, OF PHILADELPHIA, PENNSYLVANIA, A CORPORATION OF PENNSYLVANIA.

METHOD AND APPARATUS FOR MAKING HOBS.

Application filed April 26, 1921. Serial No. 464,661.

*To all whom it may concern:*

Be it known that I, OLIVER G. SIMMONS, a citizen of the United States, residing in the city and county of Philadelphia, State of Pennsylvania, have invented new and useful Improvements in Method and Apparatus for Making Hobs, of which the following is a specification.

My invention relates to the manufacture of relieved taps, such as employed for internally threading nuts or other bored pieces of metal.

In accordance with my invention, a tap blank, either of constant diameter or tapered, and either previously gashed or not, has cut therein relieved threads by rotating the blank and by simultaneously rotating in thread-cutting relation therewith upon an axis parallel or approximately parallel with the axis of the blank, a hob having relieved cutting teeth disposed in a series of parallel circumferentially extending rows without lead, and moving the blank and hob longitudinally with respect to each other and simultaneously feeding the hob towards the blank and withdrawing it.

My invention resides also in the method of and apparatus for cutting a hob of the character referred to or analogous cutter.

My invention resides in the methods and apparatus hereinafter described and claimed.

For an illustration of my invention, reference is to be had to the accompanying drawings, in which:

Fig. 4 is an end elevational view of the hob and a sectional view of the tap blank when threaded before gashing or fluting.

Fig. 5 is an elevational view of a tapered tap blank and the associated hob.

Fig. 6 is a perspective view of apparatus for cutting the hob, and is illustrative of the method of cutting the hob.

Figure 1:
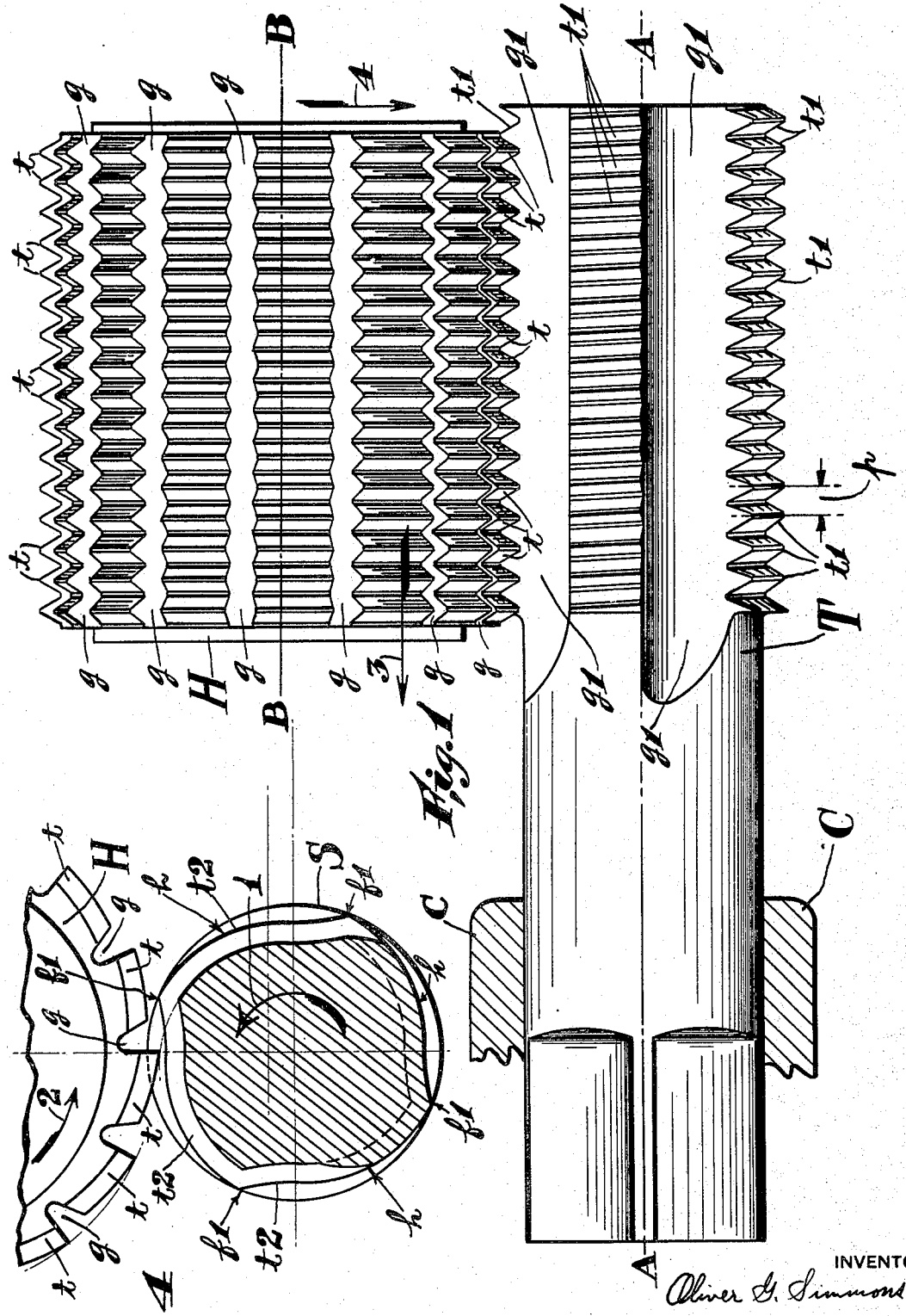
Fig. 1 is an elevational view showing the hob and tap in co-acting relation.
Figure 2:
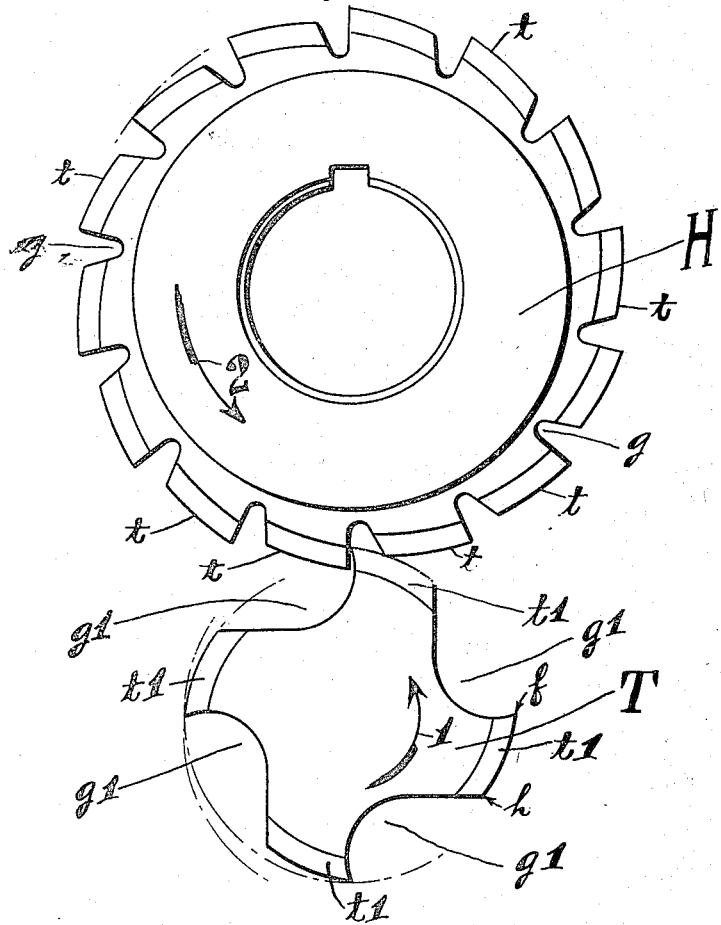
Fig. 2 is an end elevational view of the hob and tap with the hob in withdrawn position.
Figure 3:
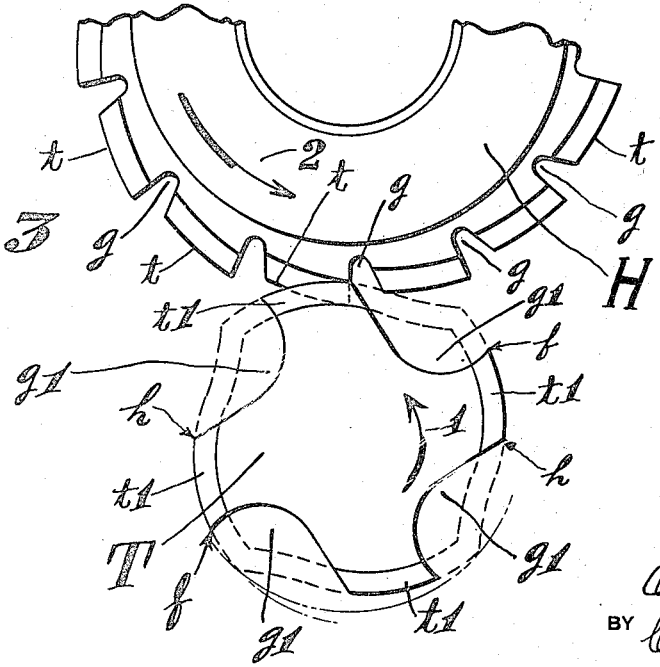
Fig. 3 is a fragmentary end elevational view of the hob and tap with the hob axis closer to the tap axis than in Fig. 2.

Referring to Figs. 1, 2 and 3, T is a cylindrical tap blank or tap rotated about its axis A, as by a rotating draw-back chuck C or any equivalent means. Disposed upon a rotating arbor, or equivalent, not shown, is the hob H rotated about its axis B. The hob is provided with a longitudinal series of rows of circumferentially extending relieved cutting teeth $t$. The rows of teeth are parallel to each other and without lead longitudinally of the hob, which is provided with the usual longitudinally extending gashes $g$ between the heel of each cutting tooth and the front or cutting edge of the immediately succeeding tooth.

The external diameter of the hob may be made anything suitable relative to the diameter of the tap to be cut, but it is preferred that the hob shall be of relatively large diameter as compared to the tap to facilitate the relief movement of the hob or relief of the tap threads.

The number of rows of cutting teeth upon the hob is preferably equal or approximately equal to the number of threads to be cut upon the tap.

The hob is preferably rotated at high speed as compared to the speed of rotation of the tap blank, which latter preferably makes but a single revolution, or somewhat more, for the complete tap-threading operation during which the hob is fed longitudinally of the tap, or vice versa, a distance at least equal to or somewhat more than the pitch $p$ or distance between neighboring threads of the tap. With the blank T rotating, as in the direction of the arrow 1, and the hob H rotating in the direction of the arrow 2, and while simultaneously fed longitudinally as in the direction of the arrow 3, the hob is also fed toward the tap blank in the direction of the arrow 4, cutting in the tap blank threads $t^1$ between the gashes $g^1$ previously cut in the tap blank. As will be more readily observable from Figs. 2 and 3, the tap teeth are relieved, since the radius of the heel $h$ of a thread $t^1$ from the axis A of the tap is less than the radial distance to the front or cutting edge $f$ of the thread. When the hob teeth reach that portion of the tap gash $g^1$ adjacent the heel $h$, the hob is quickly withdrawn, as to position indicated in Fig. 2, and thereafter again fed inwardly, as to or through the position indicated in Fig. 3 in cutting the tap threads $t^1$ on the next segment or flute of the tap blank. While the hob is being fed toward the tap blank, and particularly while cutting the blank, its rate of feed is relatively slow, while its withdrawal, upon reaching a gash $g^1$, is relatively rapid.

In Fig. 1 the hob is shown in the position corresponding more or less with the position indicated in Fig. 3 at or near the completion of the inward feed, or completion of the cutting of the teeth $t^1$ on one of the blank flutes or segments.

In lieu of preparing a gashed tap blank, before the threading operation, bar stock, indicated at S, Fig. 4, may be employed as the tap blank and held and rotated as described in connection with the tap blank T, Fig. 1. In this case the procedure is the same as above described, but since there are no gashes in the bar stock or blank, the threads cut therein by the hob will take a form substantially that indicated at $t^2$. After completion of the threading, which in the example illustrated is suitable for the production of a four-gash tap, the tap is gashed longitudinally, the points $f^1$ corresponding with the front or cutting edge of the tap threads, a gash extending from such front or cutting edge to any suitable point ahead, in the direction of the arrow 1, as to the point indicated at $h$, which will then be the heel of the tap thread.

The speed of revolution of the hob H may be anything suitable or desirable, but is relatively high compared to the speed of rotation of the tap blank, since the tap threads upon a single segment or flute of the tap blank are cut to full depth during substantially a quarter (in the case of a four-gash tap) of a revolution of the blank. By way of example merely, and without limitation of my invention thereto, the hob H may make 6000 revolutions for one revolution of the tap blank, corresponding with a feed of one-thousandth of an inch (.001), on a tap of six inches circumference, for one revolution of the hob.

While in Fig. 1 I have shown a U. S. standard thread, it will be understood that my invention is not limited to the type of thread, since the method disclosed is applicable to the cutting of any type of thread.

In Fig. 5 the hob H is utilized for threading a tapered tap blank $T^1$. The method is similar to that above described, except that the axis A of the blank is disposed at suitable angle, depending upon the taper, with respect to the axis B of the hob; however, the axis B of the hob is again substantially parallel with the adjacent surface of the blank.

A hob of the character hereinbefore described may be cut by a method and apparatus illustrated in Fig. 6, wherein H is the hob blank secured upon a suitable arbor $a$ rotated at any suitable speed by any suitable means in the direction of the arrow 5. Operating upon the blank is the cutter D rotated in the direction of the arrow 6 by the shaft $b$, driven by the bevel gear $c$ meshing with and driven by the bevel gear $d$ secured upon the shaft $e$ splined for longitudinal movement with respect to its driving sleeve $i$ on which is secured the pinion $j$ meshing with the fixed rack $k$ extending parallel with the axis of the arbor $a$, the shaft $e$ extending transversely to the axis of the blank H, whereby the cutter D may be fed into and withdrawn from cutting relation toward the blank H a plurality of times per revolution of that blank, for effecting relief of the hob teeth. The cutter D may also be fed to different depths by transverse screw feed.

With the shafts $b$ and $e$ rotating at the same speed, as may be procured by giving to the bevel gears $c$ and $d$ equal pitch diameters, then by giving the pinion $j$ and cutter D equal pitch diameters, the cutter and its driving mechanism $b$ to $j$, supported by a carriage, not shown, are moved in the direction of the arrow 7, or the reverse, parallel to the axis of the blank H, whereby the cutter teeth will generate in the blank H parallel threads, without lead longitudinally of the axis of the blank, since the longitudinal feed of the cutter will cause its rotation by the coaction of the pinion $j$ with the stationary rack $k$, or by equivalent means, at a rate such as to cut parallel threads without lead and whose distance apart or pitch will correspond to the distance apart on its pitch circle of the cutting teeth of the cutter D.

Simultaneously with the above described cutting action, the cutter is moved slowly into the blank H and then quickly withdrawn therefrom to relieve the threads cut in the blank, which latter may have been previously gashed longitudinally, as indicated at $g$, or gashed after the threading operation, as described in connection with the tap, Fig. 4. It is preferred, however, that the hob blank be previously gashed, in which case the cutter D is fed inwardly at right angles to the axis of the blank from the front or cutting edge of a gash until the succeeding gash is reached, whereupon the cutter D is quickly withdrawn in reverse direction, and the cycle repeated for each circumferential segment of the hob blank.

The cutter D may cut the threads upon the hob H to full depth in once longitudinally traversing the hob, or successive cuts may be taken. Preferably, the hob blank H will make many revolutions for each revolution of the cutter D, the cutter D revolving only when the cutter is moved longitudinally of the hob blank.

What I claim is:

1. The method of forming in a hob blank a longitudinal series of rows of circumferentially spaced relieved teeth without longitudinal lead, which consists in rotating the blank, feeding transversely in and withdrawing from cutting relation with the hob blank a plurality of times per revolution of the hob blank a cutter having cutting teeth having a circumferential pitch equal to the distance between adjacent rows of the hob teeth and rotatable about an axis at right angles to the axis of rotation of the blank, moving the cutter parallel with the axis of rotation of the blank, and simultaneously rotating the cutter at a speed equal to its linear speed parallel to the axis of said hob divided by the circumference of the pitch circle of its cutting teeth.

2. The method of forming in a hob blank a longitudinal series of rows of circumferentially spaced relieved teeth without longitudinal lead, which consists in rotating the blank, feeding transverseily in and withdrawing from cutting relation with the hob blank a plurality of times per revolution of the hob blank a cutter having cutting teeth having a circumferential pitch equal to the distance between adjacent rows of the hob teeth and rotatable about an axis at right angles to the axis of rotation of the blank, moving the cutter parallel with the axis of rotation of the blank, and simultaneously rotating said cutter by a pinion movable therewith parallel to the axis of said hob blank, said pinion being rotated by engagement with a fixed rack extending parallel with the axis of said hob blank, said pinion and cutter rotating at equal speeds and having equal pitch diameters.

3. The method of forming in a hob blank a circumferential series of rows of circumferentially spaced relieved teeth without longitudinal lead, which consists in rotating the blank, feeding transversely in and withdrawing from cutting relation with the hob blank a plurality of times per revolution of the hob blank a cutter having a circumferential series of cutting teeth and rotatable about an axis at right angles to the axis of rotation of the blank, feeding the cutter longitudinally parallel to the axis of rotation of the blank, and simultaneously rotating the cutter at a speed which provides the desired longitudinal spacing of the rows of hob teeth.

4. Apparatus for cutting in a hob blank a longitudinal series of rows of circumferentially spaced relieved teeth, comprising means for rotating the blank, a rotatable cutter having a circumferential series of cutting teeth rotatable about an axis at right angles to the axis of rotation of the blank, means for feeding the cutter into and withdrawing it from cutting relation with the blank a plurality of times per revolution of the blank, means for moving said cutter longitudinally parallel to the axis of rotation of the blank, and means determining the speed of rotation of said blank comprising a pinion in driving relation therewith, and a fixed rack meshing therewith and extending parallel with the axis of rotation of said blank.

5. Apparatus for cutting in a hob blank a longitudinal series of rows of circumferentially spaced relieved teeth comprising means for rotating the blank, a rotatable cutter having a circumferential series of cutting teeth rotatable about an axis at right angles to the axis of rotation of the blank, means for feeding said cutter into and withdrawing it from cutting relation with the hob blank a plurality of times per revolution of the hob blank, a rack extending parallel with the axis of rotation of the blank, a pinion meshing therewith, a shaft splined to said pinion and extending transversely of the axis of the blank, meshing bevel gears secured, respectively, on the cutter shaft and said splined shaft, and means for moving said pinion, cutter and intermediate driving structure longitudinally parallel with the axis of said blank.

In testimony whereof I have hereunto affixed my signature this 21st day of April, 1921.

OLIVER G. SIMMONS.